S. JACKSON.
CORNER TURNING INDICATOR FOR AUTOMOBILES.
APPLICATION FILED JUNE 1, 1914.

1,136,139.

Patented Apr. 20, 1915.

2 SHEETS—SHEET 1.

Witnesses:
G. Sargent Elliott.
Adella M. Fowle.

Inventor:
Summer Jackson
By H S Bailey Attorney.

S. JACKSON.
CORNER TURNING INDICATOR FOR AUTOMOBILES.
APPLICATION FILED JUNE 1, 1914.
1,136,139.
Patented Apr. 20, 1915.
2 SHEETS—SHEET 2.
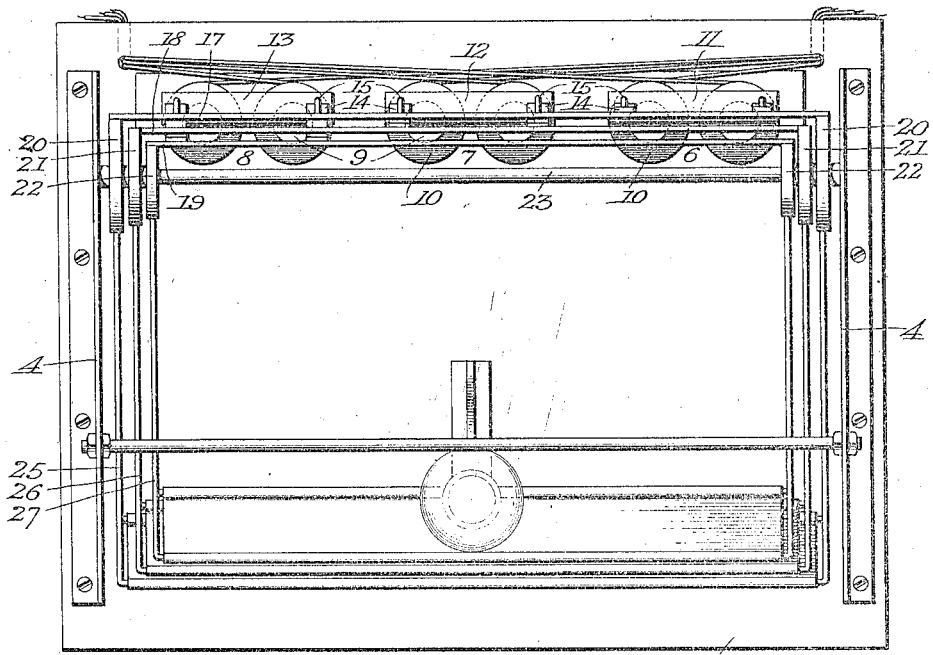
Fig. 4.
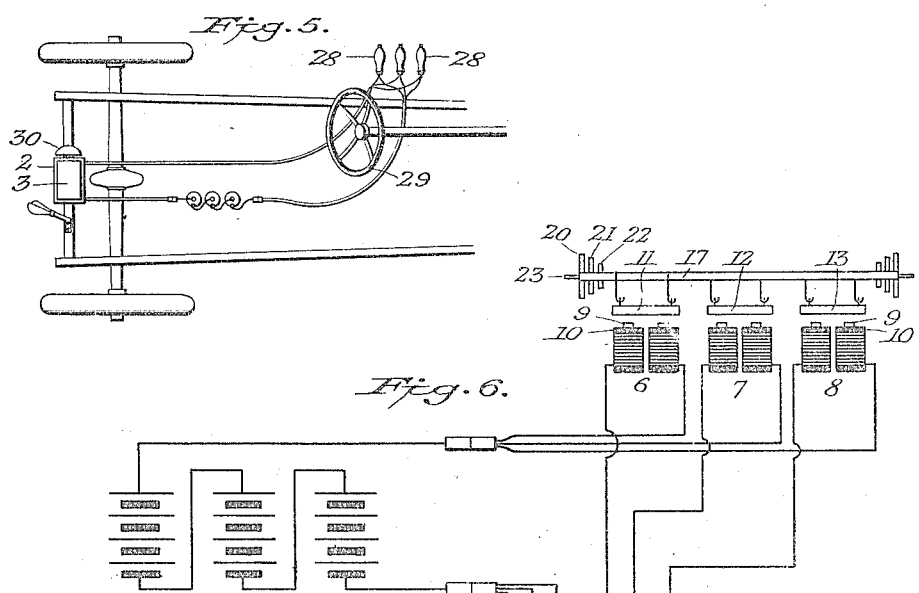

UNITED STATES PATENT OFFICE.

SUMNER JACKSON, OF DENVER, COLORADO.

CORNER-TURNING INDICATOR FOR AUTOMOBILES.

1,136,139.  Specification of Letters Patent.  Patented Apr. 20, 1915.

Application filed June 1, 1914. Serial No. 842,163.

*To all whom it may concern:*

Be it known that I, SUMNER JACKSON, a citizen of the United States of America, residing in the city and county of Denver and State of Colorado, have invented a new and useful Corner-Turning Indicator for Automobiles, of which the following is a specification.

Figure 1:
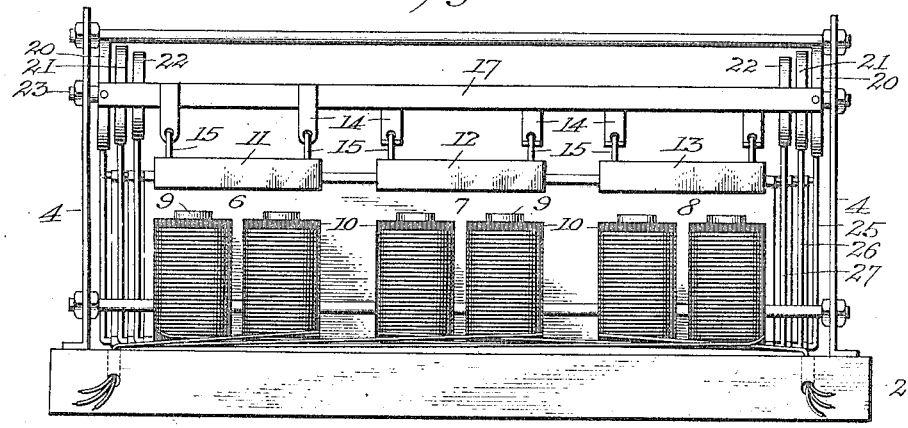
Figure 2:
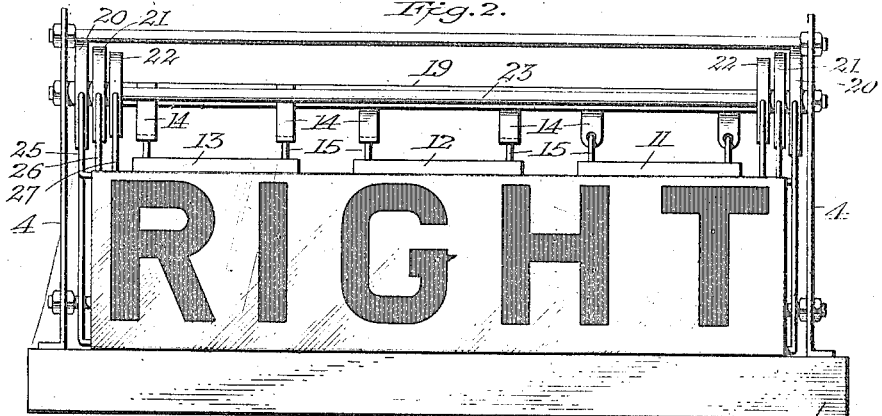
Figure 3:
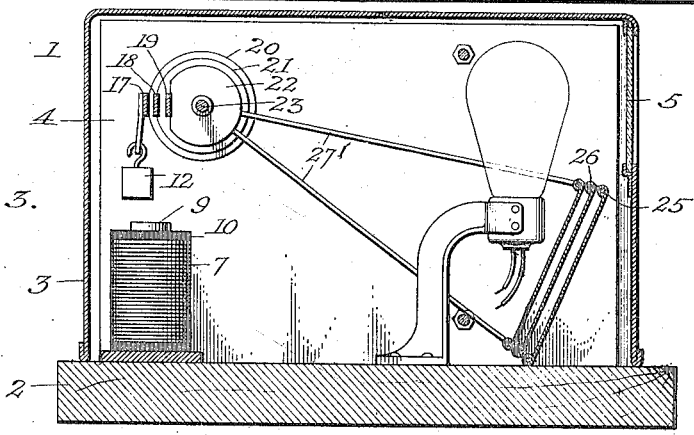

My invention relates to an electrically operating street corner turning indicator and alarm signal for use on automobiles to indicate the vehicles in the rear of a car which way the car is going to turn; and the objects of my invention are: First, to provide an indicator for the rear end of automobiles, by means of which a chauffeur of an automobile approaching the intersecting corners of two streets, can indicate to a chauffeur in a car close behind the direction he intends to take, that is, whether he intends to turn around the right hand or around the left hand corner. Second, to provide also an indicator to indicate to a car behind that he intends to stop. And third, to provide an alarm indicator that will indicate the direction of turning corners, as well as sounding an alarm to call attention of the chauffeur in the rear car to the car immediately in front of him, in order that his attention may be called to the corner turning indicator. I attain these objects by the mechanism illustrated in the accompanying drawings, in which:

Figure 1, is a rear side view of the improved direction indicator, the cover therefor being removed. Fig. 2, is a front side view of the same, showing the outside indicating sign. Fig. 3, is a vertical, transverse sectional view with the cover in place.
Fig. 4, is a plan view, the cover being removed. Fig. 5, is a fragmental plan view showing the application of the indicator to an automobile. And Fig. 6, is a diagrammatic view illustrating the batteries, the magnets, the circuit closers, and armatures connected to the pivoted sign supporting frames, and comprising the electrical operating means for the indicator.

Similar letters of reference refer to similar parts throughout the several views.

My corner turning indicator is intended to be secured to the rear end of an automobile, and to be operated by an electric current furnished from a group of batteries placed in the car; where cars have a supply of electric current, my indicator can be connected to that supply. My corner turning indicator is adapted to be operated by the chauffeur by the manipulation of switches, which may be arranged to be controlled by the chauffeur as desired. I preferably arrange it to be operated by push button switches, which are positioned conveniently to be manipulated by a hand of the chauffeur, but if desired these switches can be operated by a chauffeur's foot.

Referring to the drawings,—The numeral 1 designates a cabinet, and it consists of a base plate 2, a cover or lid 3, and side plates 4. The cover or lid may be removably secured to lift bodily from the base and side plates, or it may be hinged to the base to swing open. I have illustrated it as being adapted to be raised bodily from the base, to which it may be securely but removably fastened by any suitable means.

The front side of the cabinet is provided with a glass front portion 5, through which light enters the cabinet and enables a person some distance from the rear end of a car on which my indicator is placed, to readily read the signs I employ, in the day time, and as readily in the night time, as the interior of the cabinet may be illuminated, or a light thrown on the signs from the outside. When the interior of the cabinet is illuminated, a transparent sign would be used. My invention, however, contemplates the use of an electric light to illuminate the signs by night, and I have illustrated the same lighted from both the interior and outside. Upon the base plate 2 of the cabinet, and between its sides, I secure the operative sign, alarm, and illuminating mechanism of my invention, which consists of the following instrumentalities:

Along the rear side of the base plate, I place three magnets 6, 7, and 8. These magnets may consist of any type or shape of magnet that is adapted to be energized by an electric current. I preferably illustrate, however, each of these magnets made in the form of a pair of magnetic coils wound on suitable spools. Each spool of each pair of coil magnets is provided with a pole piece 9, that projects slightly above the top of the fiber disk 10 of the spool, and is preferably flat on top, and those of the three pairs of coils are preferably all of the same height. Adjacent to these three pairs of coil magnets, and in operative make and break relation to them, I place make and break armatures 11, 12, and 13. These armatures are supported by any suitable apparatus, in make and break relation to the magnets, to operate the three signs I use in my indicator when necessary. I preferably, however, carry out this feature of my invention in the following manner: Each armature is preferably suspended to hang from brackets 14, two brackets being shown, one at each end portion of each armature. The armatures are attached to the brackets loosely, preferably by hooks 15, which are attached to the armatures at one end and fit loosely in apertures formed in the free ends of the brackets, and the opposite ends of each pair of brackets of each armature are secured to a cross bar. There are consequently three separate cross bars 17, 18 and 19, and the armature 11 is secured to the cross bar 17, the armature 12 is secured to the cross bar 18, and the armature 13 is secured to the cross bar 19. These three cross bars are entirely independent of each other, and each is provided with a reciprocal movement that is imparted to it by the make and break reciprocal movement of the armatures to and away from the poles of the magnets, and these reciprocal movements of the armatures and cross bars operate to raise the three signs I employ to indicate the corner turning direction and if the chauffeur intends to stop. One of these three signs has painted on it the word "Right," another the word "Left," and another the word "Stop;" and they are raised one at a time by these three cross rods, moved one at a time by their armatures in front of the glass window of the cabinet, where each may be seen and read from a considerable distance at the rear of the car the indicator is on.

There are a number of ways in which these features of my invention may be operated. I preferably, however, carry out these features of my invention in the following manner: The three cross bars that support the three armatures are secured to the peripheries of three disks. The cross bar 17 is secured to disks 20, the cross bar 18 to disks 21, and the cross bar 19 to disks 22, and the disks as well as the cross bars are entirely independent of each other. All six of these disks are rotatably mounted on a cross shaft 23, that extends between and through the side standards, and is removably secured thereto preferably by threaded ends and nuts at its opposite ends. The disks are made progressively enough larger than each other to allow the cross bars to lie side by side parallel to and far enough from each other to prevent them from interfering with each other. These disks are arranged in pairs, one pair of the same size being provided for each cross bar, and they are positioned at opposite end portions of the shaft inside of the standards and close enough together to oscillate on the shaft without interfering with each other. From the opposite sides of each pair of these cross bar supporting disks, two wire frames 25, 26, and 27 extend to the front end glass display portion of the cabinet. The frames 25, 26, and 27 of these three pairs of disks, consist of right angular shaped frames made preferably of round wire bent into a three sided shape, with the free ends of the two frames inserted onto the peripheries of the disks, or they can be otherwise secured to them.

There are two wire frames secured to each pair of disks, and each frame extends from one disk of each pair along the adjacent side standard to the front glass display side of the cabinet, and along that side of the cabinet to close to the opposite standard, and along it to the other disk of the pair of disks to which the wire frame belongs. The two wire frames extend from each pair of disks at different radial angles of sufficient divergence to support between them a sign which is secured to them at its upper and lower side edges, by any suitable means. Thus the sign with the word "Right" on it, is secured to the two wire frames 25 of the outside disks 20 that support the cross bar 17. The two wire frames 26 of the next pair of disks 21 support the sign with the word "Left" on it, and the two wire frames 27 of the disks 22 support the sign with the word "Stop" on it. These three wire frames are arranged so that they nest one within the other close together, but still far enough apart to entirely clear each other in their operative display movements. The sign words are preferably painted on strips of card-board, and the card-board strips are secured along their upper and lower edges to the wire frames, by any suitable means. My invention, however, contemplates any suitable type or form of lettering for the words used, and any way of securing them to any kind of a supporting device that can be moved by the wire frames and the disks and the cross bars, or other equivalent mechanism that can be operated by the reciprocal make and break movement of the armatures.

The armatures, the cross bars, the disks, and the wire frames of each sign supporting mechanism, form a rock arm that pivotally tilts and oscillates on the shaft as the armatures are reciprocally drawn toward the magnets when they are energized by the current, and move away from them when the magnets release them, owing to the overbalancing weight of the signs, which are provided to move the armatures up from the magnets when they fall to the floor of the cabinet below the window after being raised up in front of it by the downward movement of the armatures.

The three signs normally rest on the floor of the base plate, and the wire frames and disks are so relatively arranged to the reciprocal make and break movement of the armatures to the adjacent poles of the magnets, that each sign is raised from the floor up in front of the display glass of the cabinet by the downward movement of the armatures due to the magnetic attraction of the coil magnets when energized by a current of electricity, as will be more fully described hereinafter.

Each pair of coils is connected in circuit by circuit wires that extend to the group of batteries which I employ on automobiles that are not equipped with batteries or other sources of current supply. The batteries may be placed in any convenient place about the automobile, and as many are employed as may be required for the purpose. One terminal of each pair of magnet coils is connected in circuit with one pole of the batteries, which are connected in series, and the other terminals of the pairs of magnets are connected in circuit with independent push button circuit closers 28, from each of which a second wire extends to the other pole of the batteries, as will be understood by reference to Fig. 6, and the three circuit closers are positioned preferably on or adjacent to the steering wheel 29 of the automobile, or they may be if desired positioned on the floor of the automobile in position to be operated by a foot of the chauffeur, or may be attached to the dash board in front of and within easy reach of the chauffeur, but wherever placed, they each must have the same indicating sign words as its responding sign. Each corner turning indicator is made of a size that enables it to be readily read at considerable distance in the rear of an automobile using it in the day time, but at night a light is required, and is so positioned as to illuminate the sign words of my indicator.

I illustrate it attached to the cabinet and supported above and far enough forward of the top of the cabinet to throw its light directly against and through the glass display window onto the signs. The lamp used is preferably the same operatively as the lamp and light system of the automobile, and is connected to it, but an independent lamp may be employed, if desired. In order to attract attention of a chauffeur in a car at the rear of the car using my corner turning indicator, I employ an electrically operating alarm bell 30, which is attached to the cabinet and is operatively connected to the batteries and push button circuits of the coil magnets. I do not illustrate these circuits, as their arrangement is well known, but it is necessary that the bell circuit be operated from each push button independent of the other, and that they respond only to the push button and its magnet, in order that the current from the bell may not affect and accidentally operate one or both of the other magnets and throw up the wrong sign word.

The operation of my street corner turning indicator is as follows: The chauffeur on approaching close to the corners of intersecting streets, and desiring to turn to the right hand, pushes the right hand sign push button with the word "Right" either on it or close to it, and when he pushes it the magnets 6 are energized and their poles draw the armature down to them, and hold it there as long as the chauffeur holds the push button to close the circuit, and as the armature moves down, it tilts the cross bar 17 down with it and the pair of disks 20 are turned on the shaft and raise the wire frames 25 and the sign with the word "Right" on it up in front of the sign displaying window, in full view of any one in the rear of the automobile, and the sign will stay up there in front of the glass window and in full view as long at the chauffeur holds the push button switch closed. The instant he releases the pressure on the push button and opens the circuit, the magnetic circuit is broken, and the armature is released, and the weight of the sign and its wire frame being greater than that of the armature, the sign falls to the floor of the cabinet and raises the armature, which is tilted up by the pivotal turning movement of the disks 20 on the shaft. The other two magnets are operated by the push buttons in the same way, and their armatures are pulled down and the signs "Stop" or "Left" are lifted up, depending on which push button switch is thrown in by the chauffeur, who pushes the "Stop" push button switch if he desires to stop, or the "Left" push button switch if he desires to turn the corner on his left. And as each magnet and its armature and the signs work independent of the others, they are reliable and positive in their action, and as each sign is thrown up in front of the display window, the alarm bell rings continuously as long as the sign is held up by the chauffeur.

My invention provides a safe-guarding corner turning indicator that will obviate the liability of rear end collisions, and will give a sense of security to those using one of these automobiles. And while I have illustrated and described the preferred construction and arrangement of my invention, I do not wish to be limited to the construction and arrangement shown, as many changes might be made without departing from the spirit of my invention.

Having described my invention, what I claim as new and desire to secure by Letters Patent, is:

1. In a direction indicator for automobiles, the combination of a cabinet comprising a base having side standards and a removable cover, a shaft mounted in said standards, three disks of different diameters on each end of said shaft, the inner, the middle and the outer disks on one end being of the same diameter as the corresponding disks on the other end, cross bars connecting the disks of like diameter, an armature depending from each cross bar, a pair of coil magnets on the base below each armature in make and break relation to said armatures, sign-supporting frames connecting each pair of disks of like diameter, indicating cards secured to said frames, bearing respectively the words "Right," "Left," "Stop," a window in said cover, a group of batteries, push button switches, and circuit wires arranged to connect said switches to each pair of magnets independently of the others and to said batteries for energizing said magnets, thereby to raise any required sign to the said window.

2. In a corner turning stop and alarm indicator, the combination of a supporting base provided with side standards, a stationary shaft supported in said standards, three pairs of different sized disks rotatably mounted on said shaft, cross bars secured independently of each other to said disks, brackets depending from said cross bars, armatures depending loosely from said brackets, wire frames projecting from and supported by each pair of disks, signs secured to and supported by said wire frames, with magnets mounted on said base within magnetic make and break relation to said armatures, said armatures and disks and frames forming a rock arm mechanism pivotally mounted on said shaft, having a reciprocal oscillating movement to and from said magnets, means including a triple push button circuit, and a supply of current for energizing said magnets individually to raise any predetermined sign, with a cover for said cabinet provided with a display window arranged to display said signs, and an electric lamp arranged to illuminate said signs at night.

3. In a corner turning or stop indicator for the rear ends of automobiles, the combination of a base plate having a pair of separated standards mounted thereon and supporting a shaft, three pairs of disks of different diameters mounted on said shaft, three pairs of independent right angular shaped sign supporting wire frames secured to and projecting from said pairs of disks, each pair of frames being arranged to support a sign at its opposite ends, one of said signs to be provided with the word "Right," another with the word "Left," and the other with the word "Stop," a windowed cover arranged to be removably secured to said base, cross bars connecting each individual pair of disks, an armature depending from each of said cross bars, magnets for said armatures, circuit wires, push buttons, and batteries, operatively connected in circuit and positioned relative to each other to permit any one of said three signs to be moved at will to and from said display window and means for limiting the up and down movements of said frames.

4. In a direction-indicating device for automobiles, the combination with a cabinet, of a shaft mounted therein, disks of different diameters on opposite ends of said shaft, the inner disks being the smaller and the disks on one end having the same diameter as the corresponding disks on the other end, bars connecting the disks of like diameter, armatures in swinging engagement with said bars, magnet coils beneath said armatures in position to attract them, batteries, push buttons, and wires connecting said magnets, batteries and push buttons in circuit, a window in said cabinet, frames connecting the disks of like diameter having indicating signs in their outer ends and rods above and below said frames to limit their movements, said frames being operated as required by the closing of a circuit through the batteries and magnets, by means of the proper push button, whereby an armature is attracted, and a frame is thereby rocked to bring its indicating sign back of the said window.

In testimony whereof I affix my signature in presence of two witnesses.

SUMNER JACKSON.

Witnesses:
G. SARGENT ELLIOTT,
ADELLA M. FOWLE.